May 15, 1934.    R. F. HALL    1,959,236
AIRPLANE
Filed Aug. 18, 1930    2 Sheets-Sheet 1
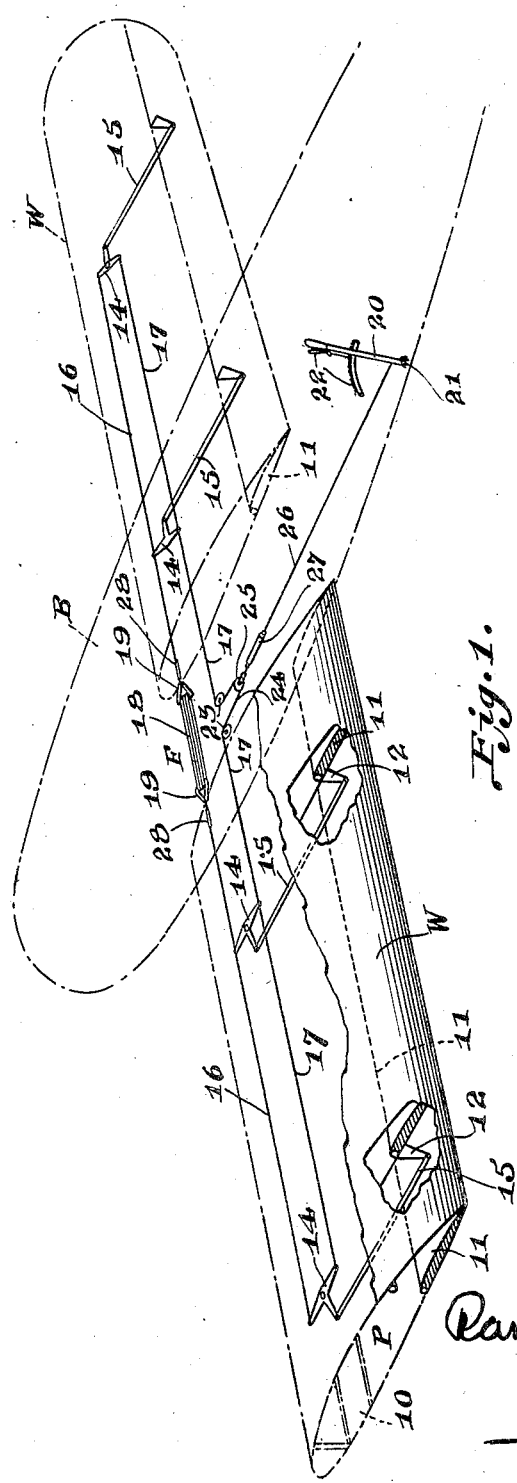
Fig. 1.
Inventor
Randolph F. Hall
Attorney May 15, 1934.   R. F. HALL   1,959,236
AIRPLANE
Filed Aug. 18, 1930   2 Sheets-Sheet 2
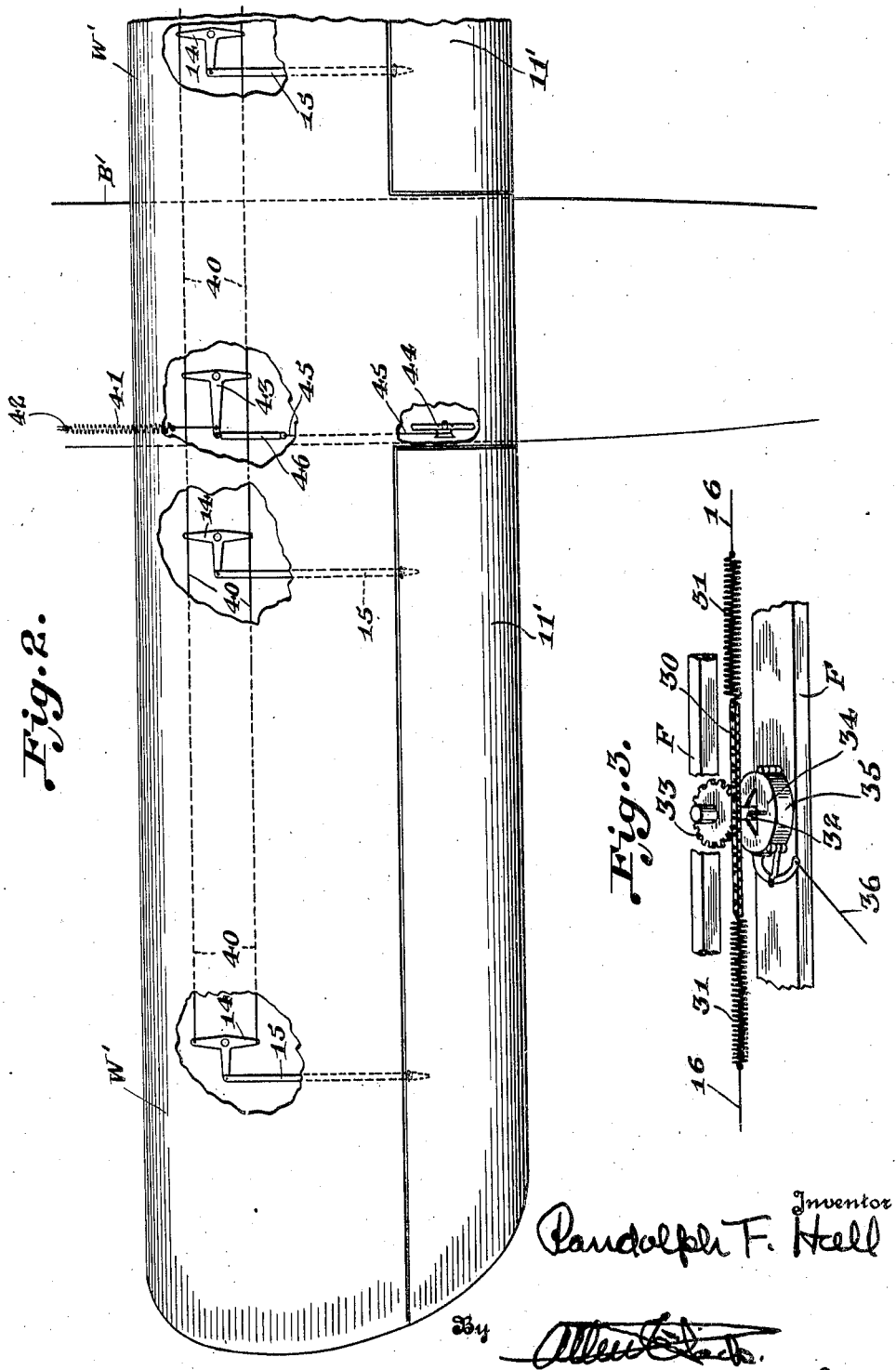

Patented May 15, 1934

1,959,236

UNITED STATES PATENT OFFICE 1,959,236

AIRPLANE

Randolph F. Hall, Rochester, N. Y.

Application August 18, 1930, Serial No. 476,155

25 Claims. (Cl. 244—12)

This invention relates to certain improvements in airplanes; and the nature and objects of the invention will be readily recognized and understood by those skilled in and familiar with the aeronautical art in the light of the following explanation and detailed description of the accompanying drawings illustrating what I at present believe to be the preferred embodiments or mechanical and aerodynamical expressions of my invention from among various other forms, arrangements, embodiments, designs, combinations, and constructions of which the invention is capable within the spirit and the scope thereof.

The invention presents a solution of certain problems encountered with, and the improvement of certain control arrangements for, those types of variable or high lift wings in which a pivotally mounted trailing portion of a wing forms a flap member which automatically functions and operates to lower and increase the camber and lift capacity of the wing under high attack angle or low speed conditions, and to raise to normal position with the wing under low attack angle or high speed conditions. Usually for maximum efficiency of automatic operation and to insure lowering of the flap member during high angle of attack or low speed flight conditions, the application of an initial lowering force to the flap member is required. During low attack angle or high speed flight conditions, air pressures acting on the flap member overcome such initial force applied to the flap and return the flap member to normal raised position, but upon change of wing conditions to those of high attack angle or low speed, and reduction of the air pressures on the flap, the initial lowering force applied to the flap member automatically acts to lower the flap member to wing lift capacity increasing position.

The initial force for lowering such a flap member is applied at spaced points along the span of the flap, generally by a series of force applying units, such as springs or the like force exerting means, and with the opposite wings of an airplane such arrangements of the force applying units require most accurate and careful adjustments thereof in order to insure balancing of the forces applied to the flaps of the opposite wings by such units. In the event of the failure of a force means or unit of one of the flap members a serious and hazardous condition results in that, unless the force applied to the opposite flap is similarly changed, the balancing of the forces of the opposite wing flaps is destroyed and the airplane is thrown out of and loses lateral balance.

A feature of the invention by which the foregoing problem and difficulty encountered with wings of the types generally referred to, is overcome, resides in the provision of means for balancing and maintaining the balance of, the initial flap lowering forces applied to the opposite wing flaps.

Another feature of the invention is provided by an arrangement of the initial flap lowering force applying unit or units for the flap members of the opposite wings of an airplane, so that, upon failure of a force applying unit or units, the lateral balance of the airplane is not changed or destroyed.

A further feature of the invention is found in the provision of an arrangement of control system for automatically operated wing flaps, together with a centralized flap lowering force applying unit operatively coupled in and for actuating such control system.

In accordance with another feature of the invention, a positively, arbitrarily operated mechanism under the control of the pilot, is provided for raising or returning and maintaining the flap member or members to and in normal position against the action of the lowering force applying means or units or to limit the extent of operation of the flap member or members.

Another feature of the invention resides in the provision of a mechanism under the control of the pilot for interposing a retarding force between the flap lowering forces of the opposite wing flap members, in order to adjust lateral balance where necessary, or for the purpose of securing a variation in unbalanced force movement of the opposite flaps to secure increased lateral control.

As a still further feature of the invention, an arrangement is provided for obtaining parallel flap motion for the flap members of opposite wings, together withe flap lowering force applying means, for the purpose of insuring lateral balance in normal flight irrespective of the point or points of lowering force application to the flap members.

With the foregoing general objects and results in view, as well as certain others which will appear from the following explanation, the invention consists in certain novel features in design and construction and in combinations and arrangements of parts and elements, as will be more fully and particularly referred to and specified hereinafter.

Referring to the accompanying drawings:

Fig. 1 is a prespective view purely diagrammatic and showing a low wing type monoplane in outline having variable or high lift wings including pivoted flap members, with a flap control system having a single centralized initial lowering force applying unit therein of the invention, and also further showing a mechanism of the invention for raising the flap members to normal position, or for limiting the extent of lowering during automatic functioning of the flaps.

Fig. 2 is a top plan view, more or less diagrammatic, of a portion of an airplane with a wing having opposite automatically operating flap members, a portion of one wing only being shown, with a flap control arrangement of the invention for obtaining parallel motion of the flap members and a single localized initial flap lowering force applying unit; and further showing a means of the invention for raising the flaps to normal position or for limiting the extent of lowering of the flaps during automatic functioning.

View 3 is a perspective view, more or less diagrammatic, of a modified form of initial force applying unit with means for interposing friction between opposite flap force applying units or permitting such units to function as a single force applying unit.

An embodiment of single initial flap lowering force applying unit operatively associated with the automatically operating wing flaps and operating cable system therefor of the opposite wings W of a low wing type of monoplane, all arranged in accordance with the invention, is more or less diagrammatically illustrated in Fig. 1 of the drawings, purely by way of an example and not of limitation for the purpose of explaining the broad principles and several features of the invention thereby exemplified. The wings W are of the so-called "Hall" high or variable lift type having the air displacement passage P through each wing with its inlet end opening through the under surface of the wing adjacent the leading edge thereof controlled by the freely swinging and floating vane indicated in dotted outline at 10, and the rear discharge end of the passage at the wing trailing edge controlled by the automatically operating flap 11.

In flight operation of such a type of wing, under low attack angle or high speed conditions the flap member 11 is raised and swung upwardly by air pressures acting thereon, to normal raised passage closing position, while front vane 10 swings downwardly to normal lowered pasage inlet closing position. With the wing under high attack angle or low speed conditions, the air pressures at the forward or leading edge portion of the wing float or swing front vane 10 upwardly within the wing to open the passage, while the reduction in air pressures below the rear under surface flap 11 permit such flap to swing downwardly to lowered, passage opening and wing under surface camber increasing position. In certain forms of this type of wing means for applying an initial lowering force to the flap member 11 are provided for insuring flap lowering and to assist in maintaining the flap lowered under the high attack angle or low speed conditions, such initial force means being overcome by the air pressures with the wing under low attack angle or high speed conditions. It is to such forms of the wing utilizing the application of an initial lowering force to an automatically operating wing flap that the invention is directed as a solution for the hereinbefore referred to problems and difficulties.

Attention is here called to the fact that while a wing of the air displacement passage, high or variable lift type is here shown as an example, it is not thereby intended to limit the invention to such type, as the principles and several features of the invention are applicable to high or variable lift or other flap type wings in which no air displacement passage is present. The invention not only contemplates but includes wings of the automatically operating flap types broadly, irrespective of the presence of air displacement passages, slots or such like arrangement.

In the selected mechanical and design expression of the invention, each wing flap 11 of the opposite wings W is provided with the spaced control cranks or horns 12 depending from the under side or surface of the flap adjacent but spaced inwardly from the tip and root ends, respectively, of the wing. Within each wing W substantially opposite flap horns 12 but spaced forwardly from flap 11, the operating cranks 14 are pivotally mounted for horizontal swinging. These cranks 14 are in the example hereof of the T type with their cross arms disposed transversely or chordwise of the wing and their central arm extended in a direction longitudinally of the wing toward the outer or tip end thereof, the cranks 14 of the opposite wings W thus having their central arms extended in opposite directions, as will be clear by reference to Fig. 1 of the drawings. The central arm of each crank 14 is operatively coupled with the respective flap arm 12 rearwardly in line therewith, by a push and pull tube 15 pivotally connected at its ends to the outer end of the central arm of crank 14 and the lower end of flap horn 12, respectively.

The spaced cranks 14 of each wing W are operatively coupled by the parallel cables 16 and 17 connected to and extending between the forward and rear ends, respectively, of the crank cross arms. Thus, moving or pulling cable 16 of a wing inwardly thereof rocks the cranks 14 to swing the central arms thereof forwardly which results in swinging the wing flap 11 downwardly through the push and pull rods 15 coupling the flap with the central arms of cranks 14. With the flap 11 in lowered position, drawing or pulling the cable 17 inwardly results in rocking cranks 14 to swing flap 11 upwardly into normal raised position, cable 16 being moved outwardly of the wing back to its normal position.

Now, in carrying out a further feature of the invention, an initial flap lowering force unit F is interposed and connected between the inner ends of wing flap actuating cable 16 which continuously exerts a pull or force drawing the opposite wing cables 16 inwardly to cause such cables, through cranks 14 and push-pull tubes 15, to swing flaps 14 downwardly to lowered position against stops (not shown). This force unit F is preferably located at a central point between the inner ends of wings W, say in the fuselage B of the airplane, and in this instance happens to comprise elastic cord 18, such as the familiar shock absorber cord of the art, stretched between and connected in the eyes or yokes 19 attached to the inner ends, respectively, of the opposite wing flap cables 16. The force unit F draws or pulls cables 16 inwardly and thus swings opposite flaps 11 downwardly to and maintains the same in lowered wing lift capacity increasing position under high attack angle or low speed conditions, while under low attack angle or high speed conditions, the increased air pressures at the under sides of flaps 11, overcome the initial lowering force applied thereto by unit F, and swing the flaps upwardly to normal raised positions, the cord 18 of the unit F yielding and further stretching under such flap raising action by the air pressures acting on the flaps.

Provision is made for raising and securing the flaps 11 in their normal raised positions against automatic operation, or for limiting the extent of lowering during automatic operation, and for instantly releasing the flaps from raised, secured position or any limited or adjusted positions, all under the control of the pilot. A possible arrangement is shown for permitting such control of the flaps, and comprises in the example hereof, a lever 20 suitably positioned in fuselage B and pivotally mounted at 21. A cooperating lock and quadrant 22 are provided for releasably securing the lever in the desired position while permitting instant release thereof, as will be readily understood. The inner ends of opposite flap cables 17 are extended rearwardly around spaced pulleys 23 within fuselage B and extended a distance rearwardly where they are connected together to form a bight 24. A floating pulley 25 is received in the inner end of bight 24, and a cable 26 is connected to this floating pulley and extends rearwardly through the fuselage B to the lever 20 with which it is operatively attached. Any suitable cable slack take-up unit 27 of the resilient or spring, or other desired type, is inserted in cable 26 and functions to maintain the required tautness in the cable and pulley arrangement described.

The flaps 11 are swung upwardly to and secured in normal raised position against automatic functioning, by swinging lever 20 rearwardly, which movement through cable 26 and pulley 25 in bight 24 of cables 17, pulls the opposite flap cables 17 inwardly to rock cranks 14 to swing flap 11 upwardly, and then locking the lever by members 22. The flaps can be instantly released for automatic functioning by unlocking members 22, whereupon the lever can swing forwardly with the flaps free to resume their normal automatic operation. The extent of lowering of the flaps during automatic functioning can be limited and adjusted by swinging lever 20 to raise the flaps to the desired point and then locking the lever. The flaps are released from any such adjusted position by merely unlocking lever 20 to free the flaps for then maximum lowering.

Thus, the single, centralized initial flap lowering force unit, such as the unit F here shown, disposed between the opposite wings W in operative connection with the opposite flap actuating cable and crank system hereof, balances the opposite flap forces and maintains the equilibrium of the flaps with the lateral balance of the airplane undisturbed. Provision is preferably made for adjusting the initial force of the unit F, as for example by the insertion of a turn buckle 28 between each flap cable 16 and the unit.

While the single force unit F has the advantage of simplicity and lower weight, the invention includes the provision of multiple force units in the system, with the result that failure of one unit would not destroy flap equilibrium or the lateral balance of the airplane, nor would the automatic operation of the flaps be stopped as the remaining unit or units would permit continuation of the automatic operation even though the action thereof is reduced. Also attention is called to the fact that failure of the initial flap lowering force beyond the elimination of increased performance of high lift is not serious provided lateral balance is not changed or destroyed.

Another arrangement of initial force unit of the invention is disclosed in Fig. 3 by which friction can be interposed in or between the initial force unit to permit of varied or independent opposite flap initial lowering force control. This arrangement is adapted for substitution for the unit F of Fig. 1, and it comprises a roller chain or the like 30 to the opposite ends of which are attached the coil tension springs 31, respectively, with the outer ends of these springs connected to the inner ends of opposite flap cables 16. Thus, the chain 30 and springs 31 connected in and between opposite flap cables 16, function as a force unit in a similar manner to the force unit F of Fig. 1.

The means for interposing friction or retarding movement to the chain 30 between springs 31, in the example hereof, embodies a shaft 32 disposed adjacent and transversely and intermediate the ends of chain 30, with the opposite ends of the shaft suitably journaled in structure F of the fuselage, as more or less diagrammatically illustrated by Fig. 3. A sprocket 33 is fixed on shaft 32 in engagement with and rotated by movements of the chain, to result in rotation of shaft 32. An external brake or the equivalent friction applying or shaft retarding or arresting mechanism, is operatively associated with the shaft 32, and in the selected example hereof is more or less diagrammatically illustrated as comprising a brake drum 34 fixed to shaft 32 with an external brake band 35 therearound operable by the brake actuating and controlling cable 36, all in a conventional manner which will be readily understood by those familiar with such types of brakes. The brake actuating cable 36 is extended to any convenient control point on the airplane for operation by the pilot to apply the brake mechanism to retard or prevent rotation of shaft 32 and endwise or longitudinal movement of chain 30. If desired any suitable chain guides (not shown) may be provided to prevent chain 30 from disengaging with the sprocket 33.

With the force unit and brake arrangement of Fig. 3, substituted in the system of Fig. 1 for the force unit F, when the brake is in normal released and non-applied position, the shaft 32 runs free, and the chain 30 and springs 31 connected thereto function as an initial flap lowering force unit in the same manner as unit F of Fig. 1. When the brake is applied and locked to prevent rotation of shaft 32 and sprocket 33, the chain 30 is then held against movement and the opposite springs 31 then function separately with the opposite wing flaps 11 operating independently and the springs 31 providing in effect individual and independent force units therefor, respectively. By applying the brake to interpose friction and retard rotation of shaft 32 permits of a degree of independent flap operation which is dependent upon the amount of friction applied to the shaft and the degree of retarding of longitudinal movements of chain 30 between springs 31. In the event of failure at one side of the system the unbalanced force would then equal the friction applied and ordinarily would not constitute a serious or hazardous condition. The arrangement of Fig. 3 also provides a means by which lateral balance can be adjusted.

It is not deemed necessary to disclose herein the mounting of ailerons on the opposite wings W, but attention is directed to the fact that with ailerons (not shown) located directly above flaps 11 on wing W, the arrangement of Fig. 3 above described permits of the ailerons beneficially influencing the automatic flap movement to secure an increase in lateral control effectiveness. For, example, with the brake 34—35 locked or interposing retarding friction between springs 31, lowering of such an aileron (not shown) with a flap 11 in a lowered position would cause a change in pressure above the flap causing the flap to further lower or swing downwardly increasing wing lift on such wing W as a whole with resulting increase in control. Raising such an aileron would cause a reverse effect and benefit and increase the control effectiveness of the up aileron positions. Ailerons such as referred to above, cooperating with automatically operating wing flaps with resulting increase in lateral control effectiveness are disclosed, and the broad principles explained, in my pending United States patent application filed July 31, 1930.

A system and arrangement of the invention is illustrated in Fig. 2 of the accompanying drawings, which functions to secure parallel flap motion irrespective of the point or points of initial flap lowering force to the opposite wing flaps, and to secure operation of both flaps together so that the flaps balance at least in normal flight. A portion of the fuselage B' of an airplane is shown together with the opposite wings W', a portion only of one of these wings being disclosed. The wings W' are of the type having the camber and lift capacity increasing flaps 11'. Spaced along the span and within each wing W' are the cranks 14 similar to those shown and described in connection with Fig. 1 of the drawings, operatively coupled with the wing flap 11' by the push and pull tubes 15, so that rocking of cranks 14 will raise and lower the wing flap. The opposite ends of the cross arms of cranks 14 of the opposite wings W' are connected by the parallel cables 40, respectively, these cables extending through both wings and across fuselage B'. In order to provide for relative adjustment of the opposite flaps 11', the lengths of the push and pull tubes 15 are adjustable, as by any of the usual tube length adjusting arrangements and mountings.

An initial flap lowering force unit is provided for the system and in the specific example hereof takes the form of a coil tension spring 41 disposed transversely with respect to cables 40 and forwardly therefrom within the fuselage B', being attached at its forward end to a fixed point on fuselage B', as diagrammatically indicated at 42. The inner or rear end of spring 41 is connected to the outer end of the center arm of a crank 43, similar to the cranks 14, which crank has its cross arm connected at its ends to and extending across and between opposite cables 40 of the system. This crank 43 and associated initial force unit spring 41 are located in the system intermediate the opposite wings W' and the inner cranks 14 of each wing. The spring 41 is under tension and normally exerts a force on the flap actuating cables and cranks to swing and maintain the opposite flaps lowered, all in the same broad manner explained with respect to the arrangement of Fig. 1.

Provision is made for raising flaps 11' upwardly to normal raised position and for securing them in raised position against the force exerted by spring 41 and against automatic operation, or for partially raising the flaps to secure them in adjusted, position limiting the extent of lowering possible during automatic functioning. For example, a hand wheel and cable drum 44 are shown disposed at a convenient point within body B' for operation by the pilot, with an actuating cable 45 extending from the wheel and drum to and connected with the outer end of the central arm of crank 43. A cable slack unit 46, such as the unit 27 referred to in the arrangement of Fig. 1, and preferably of the spring type, is connected in cable 45 between the wheel and drum 44 and crank 43. Any suitable or desired releasable locking mechanism (not shown) is provided for securing the wheel and drum 44 in the required adjusted positions against rotation. With respect to the unit 46 it should be here noted that the initial force spring 41 is considerably stiffer than the spring or other medium employed in cable slack unit 46.

In operation, by rotating wheel and drum 44 in the desired direction, cable 45 is drawn rearwardly to actuate crank 43 to pull cables 14 and swing or raise the opposite flaps 11' upwardly against initial force spring 41 to their normal raised positions. This operation will be assisted in flight by the air pressures acting on the flaps and aiding in overcoming the force of spring 41. From raised, secured position, the opposite flaps can be instantly released for resumption of automatic operation by unlocking wheel and drum 44 from secured position.

The systems of Figs. 1 and 2 both provide opposite flap initial balanced forces and throughout normal flight provide opposite flap alignment. The main difference in these two systems is found during maneuvering and abnormal flight and in gusty weather when different velocities and angles of attack take place for the opposite wings. The arrangement of Fig. 1 permits relative adjustment of flaps with the initial force remaining constant except for small frictional variations. Thus, a sudden increase in air velocity on one side would cause the flap on that side to raise slightly and the other flap would lower slightly with the lateral balance remaining substantially the same, the change in the relative setting of the flaps tending toward stability.

The automatic flap and initial flap lowering force arrangements and systems here disclosed as examples are obviously not restricted to the specific mechanisms as shown but are capable of being carried out by a wide range of equivalents. Further, the invention is not confined to any particular type of airplane wing cellule or number of wings in a cellule, as it can be readily expanded and inter-connected between wings of a multiplane cellule. If desired instead of unconnected opposite flaps, a flap continuous throughout the wing span can be employed, without departing from the principles of the invention for securing balancing of forces or parallel motion, through elimination of distortion of the effects thereof on the flap.

It is also evident that various changes, modifications, variations, additions, substitutions and eliminations might be resorted to without departing from the spirit and scope of my invention, and hence I do not desire to limit my invention to the exact and specific disclosures hereof.

What I claim, is:

1. In a high lift wing having opposite wing lift increasing members, an initial force unit actuating said members to lift increasing position, and manually controlled means independent of said force unit during operation of the latter for returning the lift increasing members to and securing the same in normal position against the action of said force unit.

2. In a high lift wing having opposite end vertically swingable and automatically operating trailing edge flaps, a force unit positioned centrally with respect to said flaps, mechanism coupling said unit with the opposite flaps respectively and actuated by the unit to swing the flaps downwardly, and manually controlled means connected with said mechanism for raising and releasably securing the flaps in normal raised position against the lowering force applied thereto by the force unit, said manually controlled means also operable to adjustably limit the extent of lowering of the flaps during automatic operation.

3. In a high lift wing having opposite wing flaps for automatic vertical swinging, an initial force unit operatively associated with said flaps for applying a lowering force simultaneously thereto, and means for applying a force to said force unit to retard operation thereof and permit of varied independent operation of said opposite flaps.

4. In a high lift wing, opposite automatically operating vertically swingable wing flaps, mechanism operatively coupling said wing flaps, an initial force unit connected in said mechanism between said flaps for exerting a force thereon lowering the flaps, said unit causing balanced operation of the flaps, and means for applying friction to said force unit to cause independent operation of the flaps.

5. In an airplane, opposite wings each having an automatically operable vertically swingable lift increasing wing flap member, means operatively associating said opposite flap members for simultaneous operation thereof, and a single force unit operatively coupled with an exerting a force on said means tending to swing said wing flap members downwardly, in combination with, mechanism yieldably coupled to said means for raising and releasably securing said opposite flap members against automatic operation.

6. In an airplane, opposite wings each having an automatically operable vertically swingable wing flap member, means operatively coupling said opposite flap members for simultaneous operation thereof, and a single force unit operatively connected to and exerting a force on said means continuously tending to swing said flap members downwardly, in combination with mechanism for adjustably limiting the downward swinging of the flap members under the action of said force unit during automatic operation thereof.

7. In an airplane, opposite wings each having an automatically operable vertically swingable wing flap member, means operatively associating said opposite flap members, a force unit operatively connected with said means and exerting a force thereon continuously tending to simultaneously lower said opposite flap members, said means arranged relative to the flap members such that with said members in lowered positions, automatic actuation of one flap member causes compensating and balancing actuation of the other flap member in the opposite direction.

8. In an airplane, opposite wings each having a vertically swingable wing flap member automatically actuated by variations in the air pressure acting thereon, means operatively coupling said opposite wing flap members for simultaneous swinging thereof, a force unit connected to said means and continuously exerting a force thereon tending to swing the flap members downwardly, and mechanism connected with said means for actuating the same to simultaneously raise said flap members and releasably secure the same in raised position against the action of said force unit, said mechanism including a yielding connection with said means.

9. In an airplane, opposite wings each having a vertically swingable wing flap member thereon, mechanism on each wing actuated by swinging of the wing flap member, members coupling the mechanism on each wing to cause simultaneous swinging of the opposite flap members, and a force unit operatively connecting and forming a portion of said members between and centrally of said opposite wings, said force unit continuously exerting a force on said members tending to swing said wing flaps downwardly.

10. In an airplane, opposite wings, an automatically operated vertically swingable wing flap on each wing, pivotally mounted crank members on each wing operatively coupled with the wing flap, a member connecting the crank members on each wing, and a force unit connected between and coupling the crank connecting members of opposite wings, said force unit continuously exerting a force on the opposite crank connecting members to swing said opposite flap members downwardly.

11. In an airplane, opposite wings, a vertically swingable wing flap on each wing, a cable system operatively coupling said opposite wing flaps for simultaneous swinging thereof, and a force unit interposed and connected in said cable system intermediate the coupling of the system with said opposite flaps, and said force unit continuously exerting a force on said cable system to simultaneously lower said opposite wing flaps.

12. In a wing, opposite automatically operating vertically swingable wing flaps, mechanism operatively couping said wing flaps, an initial force unit connected in said mechanism between the points of connection of the mechanism with the flaps, respectively, for exerting a force thereon lowering the flaps, said force unit including spaced force exerting members connected by a non-yielding member, and means operatively associated with said non-yielding member for applying movement retarding forces thereto to cause independent operation of the flaps under the influence of said force exerting members, respectively.

13. In a wing, opposite automatically operating vertically swingable wing flaps, mechanism operatively coupling said wing flaps for simultaneous swinging thereof, an initial force unit connected in said mechanism intermediate the points of connection of the mechanism with the wing flaps, respectively, for exerting a force thereon continuously tending to simultaneously lower the flaps, said force unit embodying spring members operatively associated with the wing flaps, respectively, said spring members connected by a nonyielding member, and brake means operatively associated with said non-yielding member for retarding movement thereof to cause independent operation of the flaps by the action of their respective spring members of the force unit.

14. In an airplane, opposite wings each having an automatically operated vertically swingable wing flap, a T-crank pivoted on each wing for horizontal swinging with the cross arm of the crank disposed chord-wise of the wing, said cranks operatively coupled with said wing flaps, respectively, for vertically swinging the flaps, a cable extending between and connecting the cross arms of said cranks, and a tension unit interposed and connected in said cable between said cranks to continuously exert a force on said cable to swing the cranks and simultaneously lower said wing flaps.

15. In an airplane, opposite wings each having an automatically operated vertically swingable wing flap, a crank pivoted on each wing for horizontal swinging with one arm of the crank disposed chord-wise of the wing and the other arm of the crank extending outwardly and disposed spanwise of the wing, the spanwise disposed arm of each crank operatively coupled with the flap of its respective wing for swinging such flap, a cable coupled to the chordwise arm of each crank and extending inwardly of the wing, and a tension unit coupled between and connecting the inner ends, respectively, of said cables, said unit normally exerting a force pulling said cables inwardly to swing said cranks and simultaneously lower said wing flaps, said cables and cranks with the flaps lowered by the tension unit, upon automatic operation of one flap causing simultaneous compensating swinging of the other flap in the opposite direction.

16. In a high lift wing, opposite automatically operating lift increasing members, mechanism operatively coupling said members, an initial force unit operatively associated with said mechanism for exerting a force thereon to operate said members to lift increasing position, and means for controlling said force unit to cause independent operation of said lift increasing members.

17. In a high lift wing, opposite automatically operating vertically swingable wing flaps, mechanism operatively coupling said wing flaps, a force unit operatively incorporated in said mechanism exerting a force thereon to simultaneously lower said flaps, and means for controlling the force exerted on the respective flaps by said unit to cause independent operation of the flaps.

18. In a high lift wing, opposite automatically operating vertically swingable wing flaps, mechanism operatively coupling said wing flaps, initial force means connected in said mechanism between said flaps for exerting a force thereon lowering the flaps, said force means causing balanced operation of the flaps, and means for applying a controlling force to said force means to cause independent operation of the said flaps.

19. In a variable lift wing, opposite automatically operating vertically swingable wing flaps, mechanism operatively coupling said wing flaps, force means connected in said mechanism exerting a force thereon lowering the flaps, and means for applying a controlling force to said force means to cause independent operation of the flaps.

20. In an airplane, opposite wings, a vertically swingable wing flap on each wing, operative connections between and coupling said opposite wing flaps for simultaneous swinging thereof, and a force unit interposed and connected in said connections intermediate the coupling of said connections with the opposite flaps, said force unit continuously exerting a force on said connections to simultaneously lower said opposite wing flaps.

21. In a high lift wing having opposite automatically operating lift increasing members, mechanism operatively coupling the opposite lift increasing members for automatic balanced operation of said members, and means operatively associated with said mechanism for selectively controlling said members for balanced operation thereof, or to cause said members to operate independently.

22. In a high lift wing having automatically operating opposite wing camber varying members, a single initial force unit actuating said members, means coupling said force unit with the members for automatic balanced operation of the members, and means operatively associated with said force unit to cause operation of said wing camber varying members independently of each other.

23. In an airplane, in combination, opposite wings each having an automatically operated vertically swingable flap member, initial force means for applying lowering forces to said opposite wing flaps, and mechanism actuated by and coupling the force means with the opposite wing flaps to cause compensating swinging of either flap in a direction opposite the direction of automatic swinging of the other flap with the flaps in lowered positions.

24. In an airplane, opposite wings, a vertically swingable wing flap on each wing, operative connections between and coupling said opposite wing flaps for simultaneous swinging thereof, and a force unit interposed and coupled in series with said connections for continuously exerting a force on said connections to simultaneously lower said opposite wing flaps.

25. In an airplane, opposite wings, a vertically swingable wing flap on each wing, connecting members operatively coupling said opposite wing flaps for simultaneous swinging thereof, and a force unit interposed and connected between and in series with said members intermediate the coupling of said members with said opposite wing flaps, and said force unit continuously exerting a force on said connecting members to simultaneously lower the opposite wing flaps.

RANDOLPH F. HALL.